(12) United States Patent
Vani

(10) Patent No.: US 10,407,836 B1
(45) Date of Patent: Sep. 10, 2019

(54) SYSTEM FOR PAVER SUPPORT AND METHOD FOR INSTALLATION OF SAME

(71) Applicant: Anthony Vani, Syossett, NY (US)

(72) Inventor: Anthony Vani, Syossett, NY (US)

(*) Notice: Subject to any disclaimer, the term of this patent is extended or adjusted under 35 U.S.C. 154(b) by 0 days.

(21) Appl. No.: 15/978,710

(22) Filed: May 14, 2018

(51) Int. Cl.
| | | |
|---|---|---|
| *E01C 13/02* | (2006.01) | |
| *E01C 3/00* | (2006.01) | |
| *E01C 23/00* | (2006.01) | |
| *F16L 58/00* | (2006.01) | |
| *E01C 3/06* | (2006.01) | |
| *E01C 5/00* | (2006.01) | |

(52) U.S. Cl.
CPC ............... *E01C 3/00* (2013.01); *E01C 3/003* (2013.01); *E01C 3/06* (2013.01); *E01C 5/003* (2013.01); *E01C 13/02* (2013.01); *E01C 23/00* (2013.01); *F16L 58/00* (2013.01)

(58) Field of Classification Search
CPC . E01C 3/003; E01C 3/06; E01C 5/003; E01C 9/002; E01C 13/02
USPC .............................................. 404/27, 31, 71
See application file for complete search history.

(56) References Cited

U.S. PATENT DOCUMENTS

| | | | | |
|---|---|---|---|---|
| 3,649,513 A * | 3/1972 | Peterson | ............... | E01C 3/06 204/196.09 |
| 4,501,420 A * | 2/1985 | Dury | ............... | E01C 3/006 273/DIG. 13 |
| 5,320,447 A * | 6/1994 | Ubero | ............... | E01C 7/12 404/31 |
| 5,392,806 A * | 2/1995 | Gallant | ............... | E03B 3/04 137/236.1 |
| 5,902,069 A | 5/1999 | Barth et al. | | |
| 5,951,210 A | 9/1999 | Maguire et al. | | |
| 7,344,334 B2 | 3/2008 | Thorkelson | | |
| 7,351,004 B2 * | 4/2008 | Shaw | ............... | E01C 11/226 404/17 |
| 7,425,106 B2 | 9/2008 | Altmann et al. | | |
| 7,651,293 B2 * | 1/2010 | Shaw | ............... | E01C 11/226 404/72 |
| 8,162,563 B2 * | 4/2012 | Shaw | ............... | E01C 11/226 404/17 |
| 8,834,065 B2 * | 9/2014 | Hart | ............... | E01F 5/00 405/36 |
| 10,077,536 B2 * | 9/2018 | Druce | ............... | E02B 11/005 |

(Continued)

FOREIGN PATENT DOCUMENTS

CN 204919253 * 12/2015

OTHER PUBLICATIONS

CN 206928163 description and figure, published Jan. 26, 2018 (Year: 2018).*

(Continued)

*Primary Examiner* — Gary S Hartmann
(74) *Attorney, Agent, or Firm* — The Farrell Law Firm, P.C.; John F. Gallagher, III

(57) ABSTRACT

A system for supporting a paver layer that includes a layer of sand, a concrete layer, a base, drain pipes, and a gravel layer. The layer of sand, the concrete layer and the concrete layer are each formed in a substantially horizontal direction, with the layer of sand being formed above the concrete layer and the concrete layer being formed above the base. The drain pipes are provided in a substantially vertical orientation, with an upper end of each drain pipe provided within or slightly below the concrete layer.

10 Claims, 10 Drawing Sheets

(56) References Cited

U.S. PATENT DOCUMENTS

2003/0082004 A1* 5/2003 Wilkerson ............. E01C 13/02
                                                            405/43
2003/0118405 A1* 6/2003 Sakamoto ............... E01C 13/02
                                                            405/46
2004/0250495 A1   12/2004 Manthei

OTHER PUBLICATIONS

CN 204919253 description and figure, published Dec. 30, 2015 (Year: 2015).*

* cited by examiner

| | |
|---|---|
| 1010 | Prepare base to form horizontal surface |
| 1020 | Excavate drain holes at predetermined intervals |
| 1030 | Pour gravel into each drain hole |
| 1040 | Insert a drainpipe into each drain hole |
| 1050 | Trim upper end of each inserted drain pipe |
| 1060 | Pour porous fill into a hollow of each drain pipe |
| 1070 | Place a water permeable closure across top opening of each drain pipe |
| 1080 | Pour gravel around each drain pipe |
| 1085 | Pour concrete layer, with an opening for each drain hole |
| 1088 | Form a concave portion in each opening of concrete layer for each drain pipe |
| 1090 | Deposit sand layer across concrete layer and drain holes |

FIG. 10

SYSTEM FOR PAVER SUPPORT AND METHOD FOR INSTALLATION OF SAME

1. FIELD OF THE INVENTION

The present invention generally relates to a system for supporting a layer of paver blocks, providing proper drainage of same, and a method of installation of same.

2. DESCRIPTION OF THE RELATED ART

Various paver types are known in the art, including interlocking and architectural slab pavers. See, e.g., U.S. Publ. No. 2004/0250495 to Manthei and U.S. Pat. No. 5,902,069 to Barth et al. Concrete and brick pavers can be obtained with specialty coating, finish and/or color to provide enhanced cosmetic and/or paver use, e.g., improved traction or permeability. See, e.g., Unilock Eco-Line® pavers.

Conventionally, pavers are installed on a compacted sand base or a compacted base of a sand and fine stone mixture. See, U.S. Pat. No. 7,425,106 to Altmann et al. However, when subjected to heavy loading, e.g., vehicular traffic load, such conventional base installation will often fail to provide sufficient capacity, leading to an uneven surface and often cracked pavers. Also, porosity of the base layer, i.e., ground, on which pavers are installed will vary, with different layers having a varied porosity.

To overcome such shortcomings, pavers may be installed on a reinforced concrete slab. However, installation on a reinforced concrete slab precludes adequate drainage, subjects the pavers to prolonged saturation, fosters mold growth, can discolor the pavers, ruin the finish and/or coating of the pavers, and can diminish structural integrity of the pavers.

SUMMARY OF THE INVENTION

The present invention overcomes shortcomings of conventional systems by providing a system for supporting a paver layer, the system including a layer of sand, a concrete layer, a base, at least three drain pipes, and a gravel layer. The layer of sand, the concrete layer and the concrete layer are each formed in a substantially horizontal direction, with the layer of sand being formed above the concrete layer and the concrete layer being formed above the base. The at least three drain pipes are provided in a substantially vertical orientation with an upper end of each of the at least three drain pipes provided within or slightly below the concrete layer.

Another aspect of the present disclosure provides a drain pipe that includes a first end having a first opening, a second end having a second opening, a hollow extending from the first opening to the second opening, a first water permeable closure that closes the first opening, and a second water permeable closure, with the hollow being filled with high porosity fill.

Another aspect of the present disclosure provides a method for providing a system that supports a horizontal layer of paver blocks, the method includes providing vertical excavations, in a horizontal base, of at least three substantially vertical drain holes at predetermined intervals in a pattern forming a web; pouring high porosity non-compactable material into each drain hole to a depth of less than one quarter of the depth of the drain hole; inserting a drain pipe into each of the at least three drain holes; filling a hollow extending from a top opening to a bottom opening of each drain pipe with high porosity non-compactable material; placing a respective water permeable closure across the top opening of a respective drain pipe; pouring non-compressible fill around an outer diameter of each drain pipe; pouring a concrete layer across the horizontal base, while providing an opening in the concrete layer at each drain hole; depositing a layer of sand across the concrete layer and each opening provided for each drain hole; and depositing a layer of paver blocks on the layer of sand.

BRIEF DESCRIPTION OF THE DRAWINGS

For a better understanding of the invention as well as other objects and further features thereof, reference is made to the following detailed description to be read in conjunction with the accompanying drawings, wherein:

FIG. 10 illustrates a method for providing a supporting layer for paver blocks according to an embodiment of the present disclosure.

DETAILED DESCRIPTION

The following detailed description makes reference to the accompanying drawing(s). In describing the invention, explanation of related functions or constructions known in the art are omitted for the sake of clearness in understanding the concept of the invention, to avoid obscuring the description of the invention with unnecessary detail.

Figure 1:
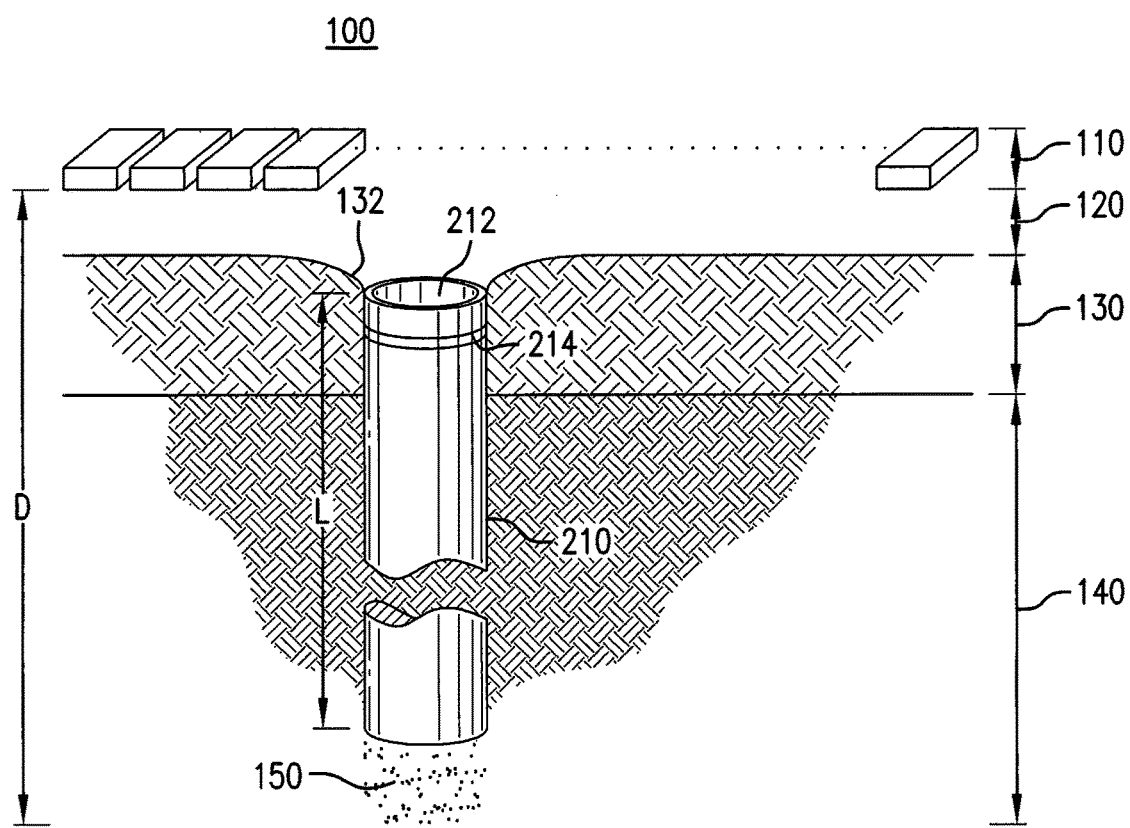
FIG. 1 is a profile view illustrating a system for supporting paver blocks according to an embodiment of the present disclosure.

FIG. 1 is a profile view of a system 100 for supporting a layer of paver blocks 110 according to an embodiment of the present disclosure. The system 100 includes the layer of paver blocks 110, a layer of sand 120, a concrete layer 130, a base 140, a drain pipe 210, and a gravel layer 150.

The base 140 is typically formed of unexcavated earth, other than the excavation/drilling of at least three drain holes 200 (FIGS. 3-7), described below. The gravel layer 150 provides a bed for water percolation from a bottom end of the drain pipe 210, and can be provided by one of a layer of porous rock and sand, as known in the art.

As shown in FIG. 1, the system 100 for supporting the layer of paver blocks 110 has a total depth (D) consisting of the combined depth of the layer of sand 120, depth of the concrete layer 130, and depth of the gravel layer 150.

Each drain pipe 210 extends from below a top of the concrete layer 130 to the top of the gravel layer 150. The gravel layer 150 preferably extends between three and six inches beyond the bottom of the drain pipe 210 to provide sufficient dispersion of water that flows into the upper opening 212 of the drain pipe 210.

The plurality of drain holes 200 are spaced apart at predetermined intervals to form a web, with each of the plurality of drain holes 200 preferably extending to a depth of two feet to perc sand or other well drained base. The depth may vary based on factors that include porosity of the surface on which the paver reinforcement is installed, the number of drain holes that form the web of drain holes, and the diameter of each drain hole in the web of drain holes. In regions with poor drainage, the at least one drain hole 200 can be made deeper, the gravel layer 150 can extend beyond six inches, and/or the spacing between drain holes 200 can be reduced.

Figure 6:
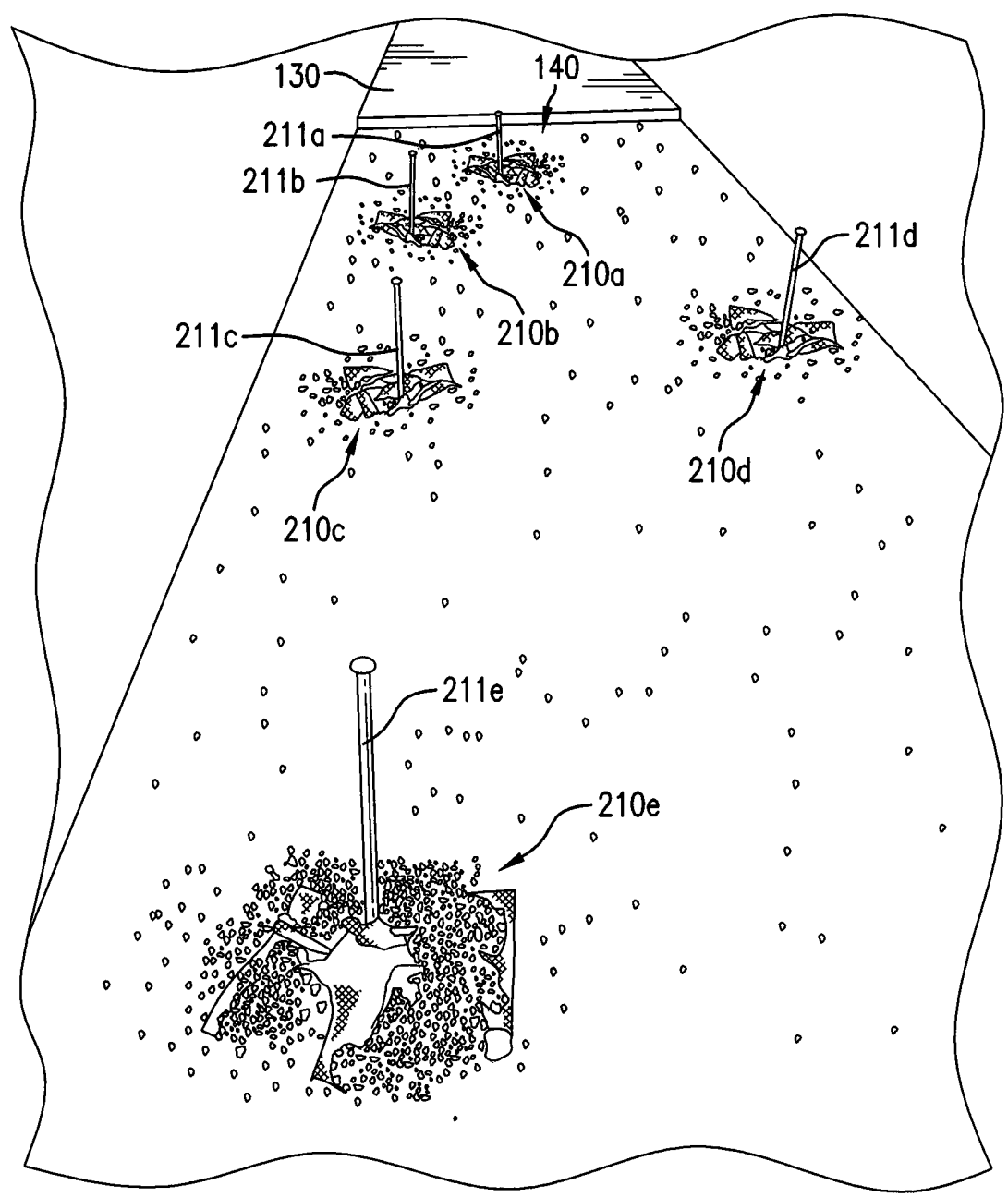
FIG. 6 illustrates the web of drain holes of the system according to an embodiment of the present disclosure.
Figure 7:
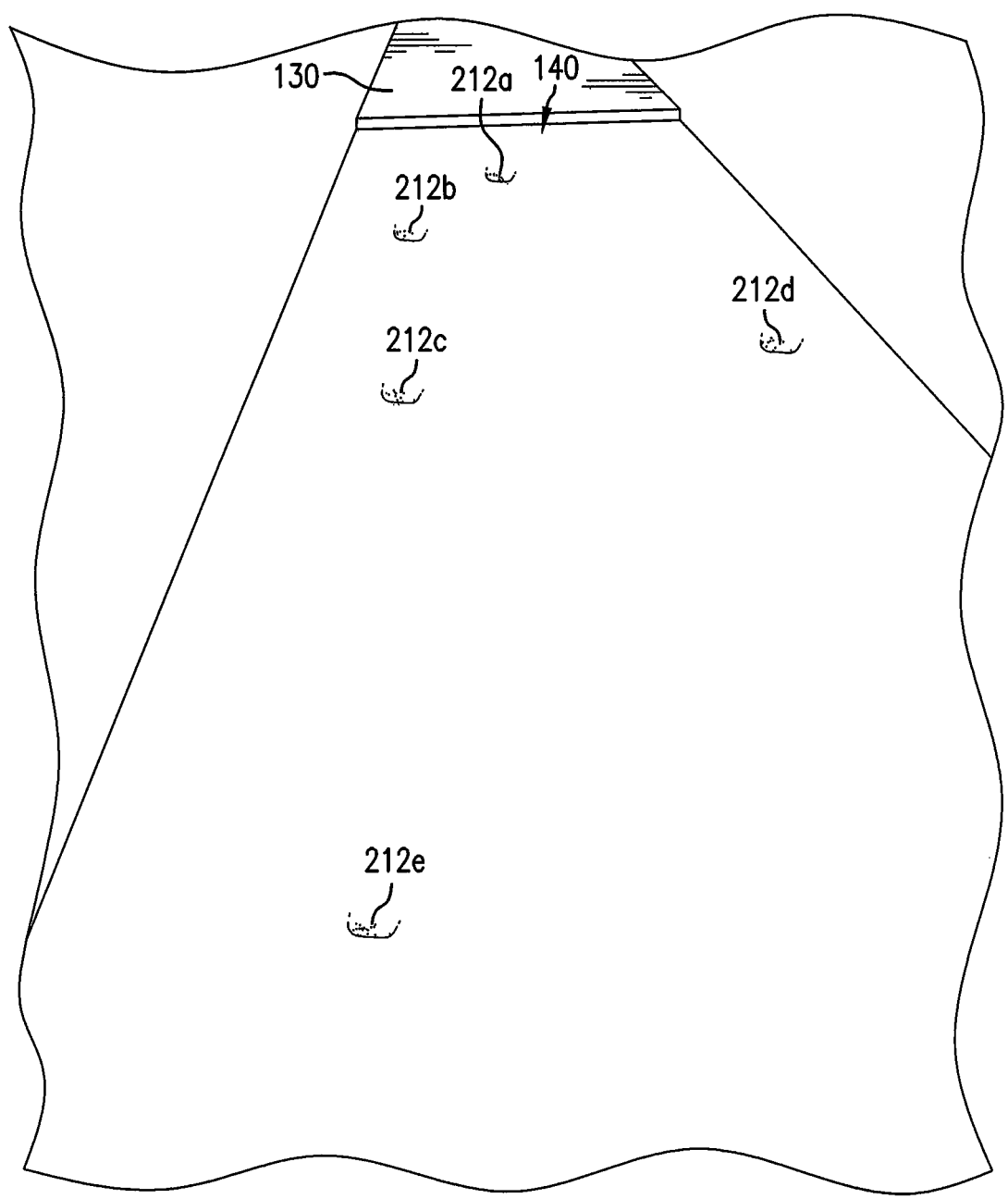
FIG. 7 illustrates a concrete slab poured over the web of drain holes of FIG. 6.

The concrete layer 130 includes a concave portion 132 for each respective drain hole of the at least one drain hole 200. The concave portion 132 has an opening at a bottom thereof at a size corresponding to the size of an opening of the drain pipe 210 that is inserted in the respective drain hole. The concave portion 132 slopes downward toward the opening positioned at a top of a respective drain hole 200 to expedite drainage of water that travels downward through the sand layer 120 by the force of gravity. As shown in FIGS. 6-7, a plurality of drain holes 200 are provided, spaced at predetermined intervals preferably every three feet across the horizontal area of the system 100.

Figure 2A:
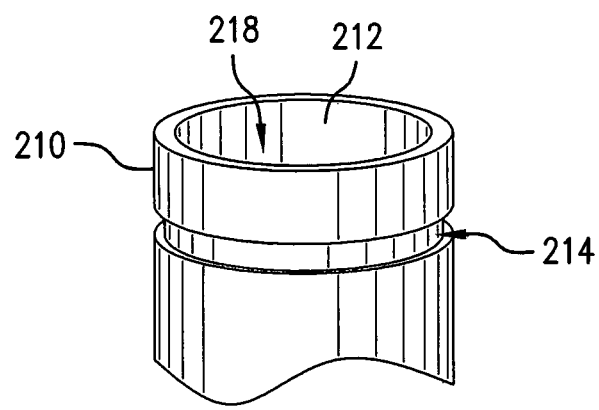
FIG. 2A is a side view illustrating an upper opening of a drain pipe of the system of FIG. 1.
Figure 2B:
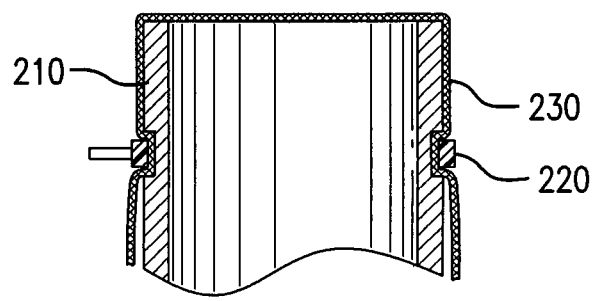
FIG. 2B is a view illustrating closing the upper opening of the drain pipe of FIG. 2.

FIG. 2A is a perspective view illustrating an upper opening of a drain pipe 210 of the system of FIG. 1, and FIG. 2B is a side view illustrating the closing the upper opening 212 of the drain pipe 210 of FIG. 2A.

As shown in FIG. 2A, a groove 214 is provided adjacent to and below an upper end of the drain pipe 210. As shown in FIG. 2B, a water permeable sand block 230 is placed across the upper opening 212 at the upper end of the drain pipe 210. The water permeable sand block 230 can be formed of landscaping fabric that allows water to flow therethrough, while blocking passage of sand.

Figure 3:
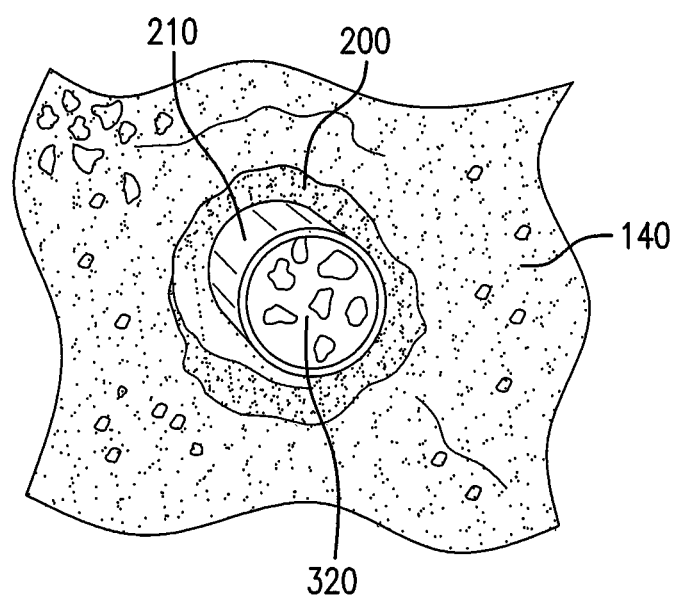
FIG. 3 is a top perspective view of the drain pipe inserted in an excavated drain hole of the system of FIG. 1.
Figure 4:
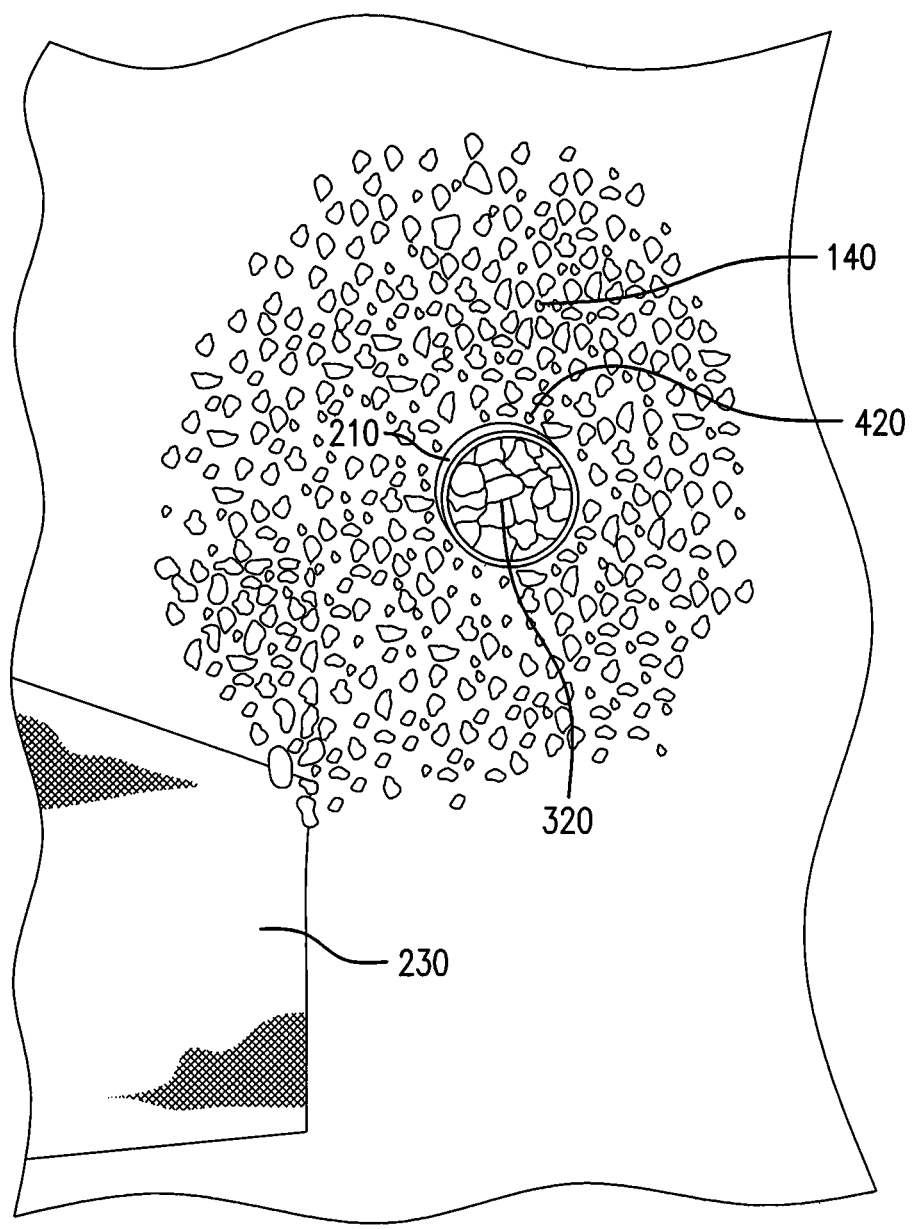
FIG. 4 is a top perspective view of the drain pipe with backfill between the drain pipe and surrounding base.

FIG. 3 is a top view of the drain pipe 210 inserted in an excavated drain hole 200 of the system of FIG. 1. FIG. 4 is a top view of the drain pipe 210 with backfill between the drain pipe 210 and surrounding base 140.

FIGS. 3 and 4 illustrate the drain pipe 210 before installation of the water permeable sand block 230.

Figure 5:
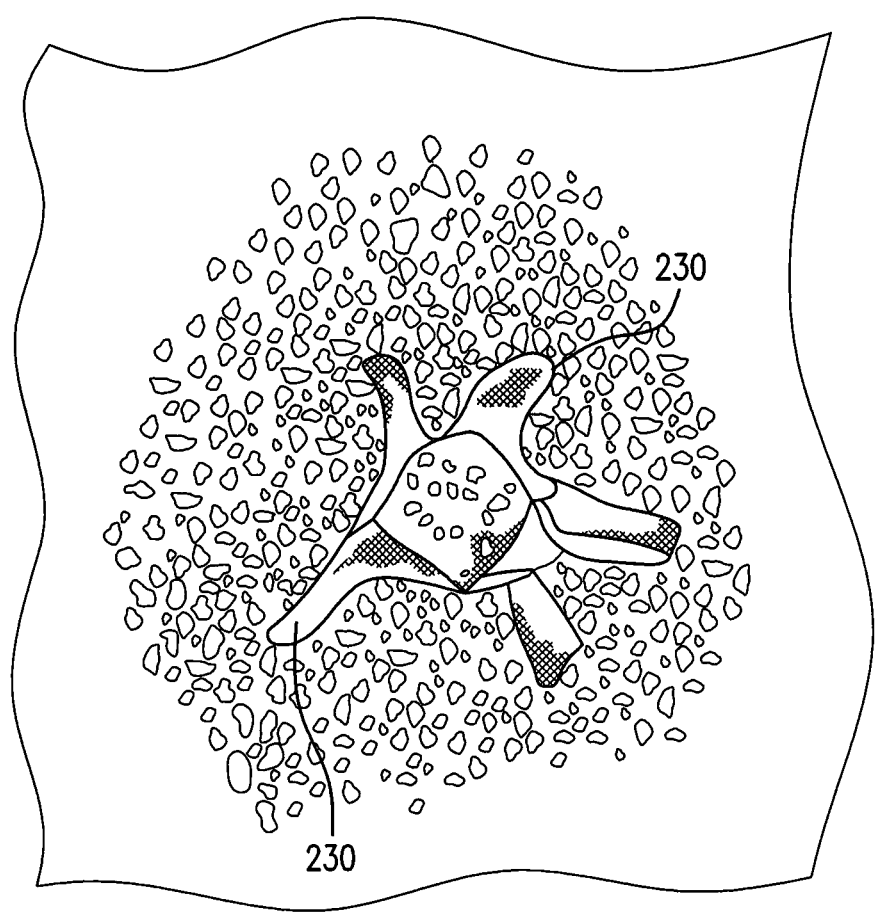
FIG. 5 is a top view of the drain pipe of FIG. 4, with a water permeable sand block installed over the top opening thereof.

FIG. 5 is a top view of the drain pipe of FIG. 4, with a water permeable sand block 230 installed over an upper opening 212 thereof.

As shown in FIGS. 1 and 3-5, the drain pipe 210 is inserted within the excavated drain hole 200, in a substantially vertical orientation.

According to an embodiment of present disclosure, after inserting the drain pipe 210 into the drain hole 200, an inner hollow 218 of the drain pipe 210 is filled with rocks and/or clean fill having a high effective porosity. The drain pipe 210 can be constructed from conventional PVC pipe, to facilitate cutting using conventional tools to size in the field, and to allow cutting to properly align the upper opening 212 of the drain pipe 210 with the bottom of the concave portion 132 formed in the concrete layer 130.

The drain pipe 210 preferably has a uniform interior diameter along a length thereof, with a five-inch diameter found to facilitate easy fill of the inner hollow 218 with rocks to maximize fluid flow downward through the drain pipe 210 to percolate through the gravel layer 150 and disperse the fluid into the earth.

As shown in FIGS. 2A, 3 and 4, the inner hollow 218 is preferably filled to the upper opening 212 of the drain pipe 210.

Filling the inner hollow 218 with rocks enhances the strength of the drain pipe 210 and prevents crushing of the drain pipe 210 when the system 100 is subjected to heavy vehicle loads. That is, rocks and/or other permeable fill that is placed in the inner hollow 218 will support the layer of sand 120 and the layer paver blocks 110.

The water permeable sand block 230 is provided to avoid sand of the layer of sand 120 from migrating into the inner hollow 218. The vertical orientation of the drain pipe 210 transfers heavy vehicle loads onto the rock fill, rather than onto the drain pipe 201, and transmits the vertical component of vehicle loading onto the system base 140, avoiding vertical movement of the drain pipe 210.

FIG. 4 shows the top of the drain pipe 210 with backfill between the drain pipe 210 and surrounding base 140, prior to installation of the flexible water permeable sand block 230.

A flexible water permeable sand block 230 can be used to allow for filling of the inner hollow 218 with rocks or other permeable matter to a level that is slightly above the upper opening 212 of the drain pipe 210, to form a crown thereon.

The water permeable sand block 230 is preferably installed across the upper opening 212 before fill 420 is installed around the drain pipe 210, since fill 420 is preferably hard pack and need not have high porosity.

The flexible water permeable sand block 230 is preferably secured to an outer circumference of the drain pipe 210 by at least one of a tie 220 and a force applied by fill 420 against outer parts of the flexible water permeable sand block 230, which is shown in FIG. 5. The flexible water permeable sand block 230 is preferably not trimmed to a size that closely matches the diameter of the upper opening 212 of the drain pipe 210, to avoid settling of sand from the sand layer 120 into the fill 420 that surrounds the drain pipe 210 in the event of misalignment of the bottom of the concave portion 132 of the concrete layer with the upper opening 212 of the drain pipe 210.

The tie 220 can include a cable tie, i.e. a zip tie, an elastic band, and the like. The fill 420 applies a securing force that prevents tie 220 from moving upward, which could result in the water permeable sand block 230 sagging into the upper opening 212 of drain pipe 210. The groove 214 provided on an end of the drain pipe 210 prevents movement of the tie 220.

According to an aspect of the present disclosure, both the upper opening 212 of the drain pipe 210 and the bottom opening located on an end of the drain pipe 210 opposite the upper opening 212 are covered with the water permeable sand block 230. According to an aspect of the disclosure, the entire drain pipe 210 can be covered with the water permeable sand block 230.

FIG. 6 illustrates the web formed by a plurality of drain pipes 210a-210e in respective drain holes, before the concrete layer 130 is poured. FIG. 6 shows marking stakes 211a-211e positioned adjacent to each respective drain pipe 210a-210e to facilitate locating the pipes 210a-210e after pouring the concrete layer 130 and shows respective water permeable sand block membranes. The upper opening 212 of each drain pipe 210 is positioned at or is cut to a depth of approximately one-half inch below the top of the concrete layer 130, with concave portions that are troweled at each location corresponding to each upper opening 212 of each drain pipe 210 after pouring the concrete layer 130.

FIG. 6 illustrates a web of drain holes of the system illustrated in FIG. 1. In FIGS. 5 and 6, the water permeable sand block 230 is illustrated with ends that terminate outside of the circumference of respective upper openings 212 of respective drain pipes 201.

Figure 8:
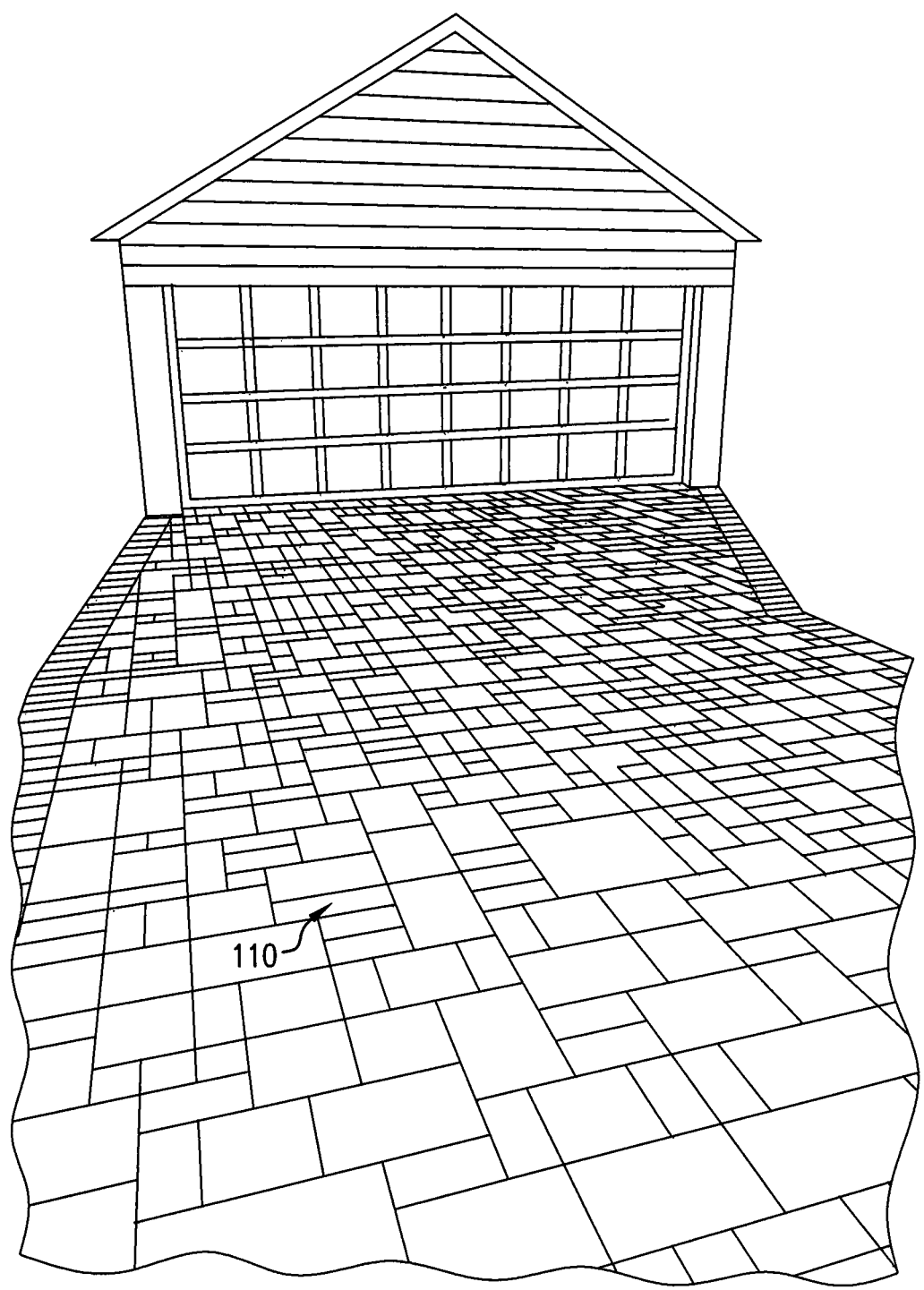
FIG. 8 illustrates pavers installed over the system of FIG. 7.

FIG. 7 illustrates a concrete slab poured over the web of drain holes of FIG. 6, and FIG. 8 illustrates pavers installed over the system of FIG. 7. As illustrated in FIG. 7, the concrete slab is poured around, and to a height that is above, the web of drain pipes 210a-210e of FIG. 6. As described above, each top of each drain pipe is covered with a water permeable sand block to prevent concrete or sand from entering the upper opening 212 of each respective drain pipe 210. After the concrete layer 130 is poured, the water permeable sand block generally assumes the same color as the concrete that forms that concrete layer 130, despite the concrete layer 130 not being poured to form a slab across each drain hole 210, i.e., the concrete layer 130 is open above each drain hole 210. Stakes 211a-211e are preferably placed adjacent to each respective drain pipe 210a-210e (FIG. 6) to facilitate locating each drain pipe 210a-210e, to locate where to provide respective concave portions in the concrete layer.

The water permeable sand block 230 provides a barrier that spans each respective upper opening 212 of each drain pipe 210, which is positioned slightly lower than the top of the concrete layer 130, thereby allowing water that impinges upon the top of the concrete layer 130 to drain into the web of drain pipes by force of gravity.

FIG. 8 illustrates the layer of paver blocks 210 installed over the concrete layer 130 of FIG. 7. Water impinging on top of the layer of paver blocks 110 will flow through side openings between the paver blocks that form the layer of paver blocks 110, will flow through the sand layer 120 and onto the concrete layer 130, and will flow across the top of the concrete layer 130 into the web of drain pipes, thereby avoiding exposure of the pavers to standing water, avoiding mold growth, extending the original coloration of the paver, and extending the structural integrity of the pavers.

Figure 9:
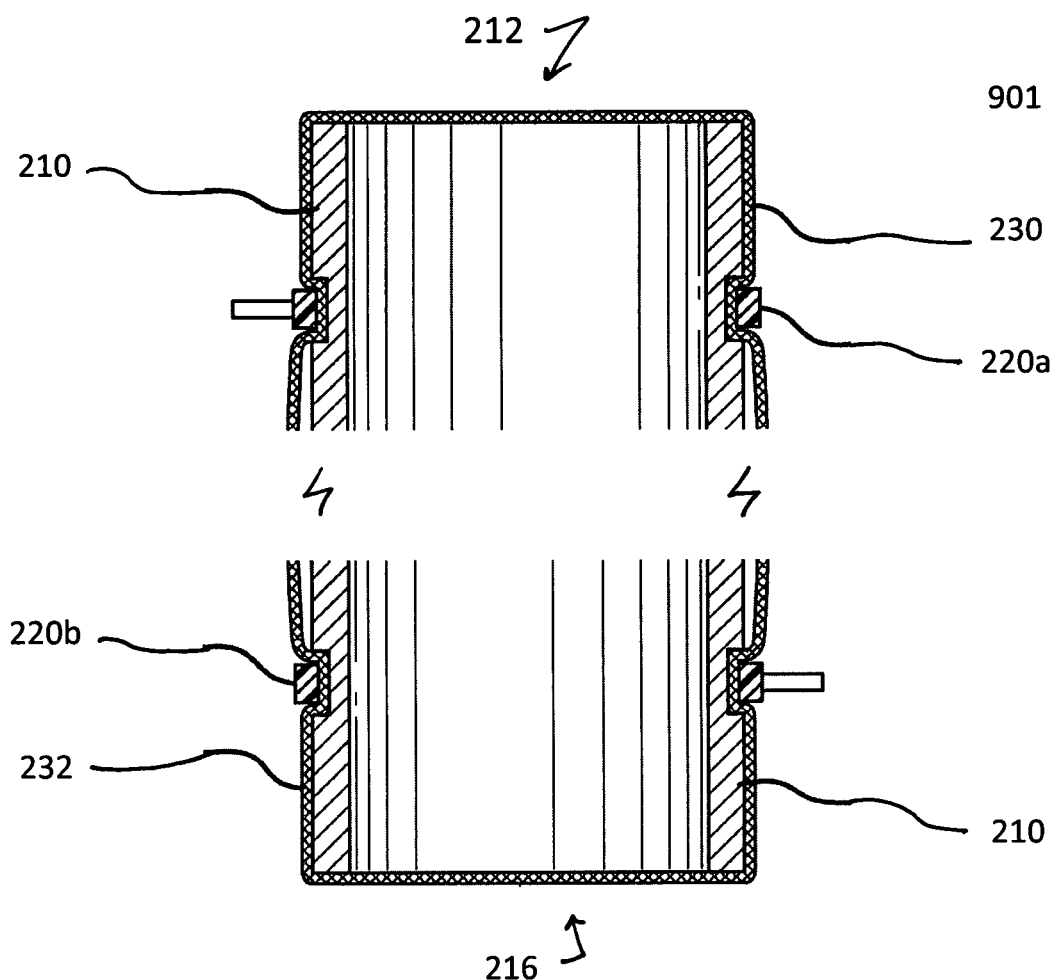
FIG. 9 illustrates a drain pipe according to an embodiment of the present disclosure.

FIG. 9 illustrates a drain pipe 210 according to an embodiment of the present disclosure, in which a second water permeable closure 232 is provided on the second opening before inserting the drain pipe into the drain hole. The drain pipe 210 includes a first end 901 having a first opening 212, a second end 902 having a second opening 216, an inner hollow 218 extending from the first opening 212 to the second opening 216. A first water permeable sand block 230 provides a closure that closes the first opening 212, and a second water permeable sand block 232 provides another closure that closes the second opening 216, and the inner hollow 218 is filled with high porosity fill. The first water permeable sand block 230 and the second water permeable sand block are landscape fabric. A groove (214, FIG. 2A) is provided in an outer circumference near the first end 901, and a tie 220a fits within the groove 214 to secure the first water permeable sand block 230 to the drain pipe 210. A groove can also be provided in an outer circumference near the second end 902, and a tie 220b fits within the groove to secure the second water permeable sand block 232 to the drain pipe 210. A single water permeable closure can wrap the entire drain pipe 210, with the single water permeable closure covering both the first and second openings, and with the inner hollow 218 being filled with high porosity fill before the drain pipe 210 is placed into the drain hole 200.

FIG. 10 illustrates a method for providing a supporting layer for paver blocks according to an embodiment of the present disclosure.

In step 1010, the base 140 is prepare to form a uniform horizontal surface, typically by excavating a top few inches of soil to expose earth having a uniform horizontal grade.

In step 1020, at least three drain holes 200 are drilled at predetermined intervals to form a web, with each of the plurality of drain holes 200 preferably extending to a depth of two feet to perc sand or other well drained base. The depth can be adjusted to ensure that the bottom of each drain hole is provided at a depth at which water can readily perc into the base 140.

In step 1030, gravel is poured into each drain hole 200, to form the gravel layer 150 of approximately six inches, to facilitate drainage.

In step 1040, a drainpipe 210 is inserted into each respective drain hole 200, in a substantially vertical orientation, with the bottom end of each drainpipe 210 resting on or near the top of the gravel layer 150.

In step 1050, each respective upper end of each inserted drain pipe is trimmed to a height just below the projected top level of the concrete pour. In step 1060, gravel or other porous fill is poured into a hollow that extends from a first (upper) opening to a second (lower) opening of each drain pipe 210.

In step 1070, a water permeable closure, i.e., a water permeable and block, is placed across the first top opening of the drain pipe and is secured with a tie. A porosity check is preferably performed after step 1070, to ensure proper drainage therethrough the drain pipe and allow for deeper drain holes, if required, prior to pouring the concrete slab.

In step 1080, gravel is poured around the outer diameter of each drain pipe to maintain each drain pipe in the substantially vertical orientation, and marking stakes are positioned adjacent to each respective drain pipe 210a-210e to facilitate locating the pipes 210a-210e.

In step 1085 the concrete layer 130 is poured, with each drain hole provided with a respective opening in the concrete layer 130.

In step 1088, prior to curing of the concrete layer, respective concave portions are formed in the concrete layer at positions corresponding to respective drain pipes.

In step 1090, the layer of sand 120 is deposited across the concrete layer 130. The layer of sand 120 is placed across each drain hole, and is compacted to provide a uniform layer onto which the layer of paver blocks is placed in step 1095.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed:

1. A system comprising:
a sand layer;
a concrete layer;
a base;
a gravel layer;
a drain pipe; and
a permeable sand block,
wherein the sand layer is formed above the concrete layer, and the sand layer and the concrete layer are each formed in a substantially horizontal direction,
wherein the drain pipe is provided in a substantially vertical orientation with an upper end of the drain pipe provided below an upper edge of the concrete layer, wherein the permeable sand block is secured by a tie to an outer circumference adjacent to an upper opening of the drain pipe, and wherein the tie is secured in a groove in the drain pipe that is adjacent to the upper opening of the drain pipe.

2. The system of claim 1, wherein a bottom end of the drain pipe terminates in the gravel layer provided in the base.

3. The system of claim 1, wherein the system is configured to support a horizontal layer of paver blocks.

4. The system of claim 1, wherein the base is formed of unexcavated earth, other than excavation of a drain hole configured to accommodate the drain pipe.

5. The system of claim 1, wherein the drain pipe includes a hollow extending from the upper end to a lower end opposite the upper end, and wherein the hollow is configured to be filled with permeable rock.

6. The system of claim 1, further comprising two additional drain pipes spaced apart from the drain pipe by a predetermined distance, wherein a web is formed by spacing the two additional drain pipes apart from the drain pipe by the predetermined distance.

7. The system of claim 1, wherein the concrete layer includes a concave portion positioned above the drain pipe.

8. The system of claim 7, wherein the concave portion has an opening at a bottom thereof of a size corresponding to a size of an upper opening of the drain pipe.

9. The system of claim 1, wherein the permeable sand block is landscape fabric.

10. The system of claim 1, wherein the permeable sand block is configured to preclude passage of sand from the sand layer and to allow flow of water therethrough.

* * * * *